US008774271B2

(12) United States Patent
Kim et al.

(10) Patent No.: US 8,774,271 B2
(45) Date of Patent: Jul. 8, 2014

(54) APPARATUS AND METHOD FOR SCALABLE ENCODING

(75) Inventors: Seontae Kim, Daejeon (KR); Krishna Reddy Konda, Hyderabad (IN); Changsik Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1231 days.

(21) Appl. No.: 12/645,734

(22) Filed: Dec. 23, 2009

(65) Prior Publication Data

US 2010/0158128 A1 Jun. 24, 2010

(30) Foreign Application Priority Data

Dec. 23, 2008 (KR) ........................ 10-2008-0132522

(51) Int. Cl.
*H04N 7/46* (2006.01)
*H04N 7/50* (2006.01)
*H04N 7/52* (2011.01)

(52) U.S. Cl.
USPC .............. 375/240.1; 375/240.11; 375/240.24; 375/240.14

(58) Field of Classification Search
None
See application file for complete search history.

(56) References Cited

U.S. PATENT DOCUMENTS

| | | | |
|---|---|---|---|
| 6,263,022 B1 * | 7/2001 | Chen et al. ................ | 375/240.03 |
| 6,904,092 B2 * | 6/2005 | Van Der Schaar ......... | 375/240.1 |
| 7,227,894 B2 * | 6/2007 | Lin et al. .................. | 375/240.12 |
| 2002/0154697 A1 | 10/2002 | Jeon | |
| 2004/0013201 A1 | 1/2004 | Song et al. | |
| 2005/0185714 A1 * | 8/2005 | Lin et al. .................. | 375/240.12 |
| 2005/0226334 A1 | 10/2005 | Han | |
| 2006/0078050 A1 * | 4/2006 | Chen ........................ | 375/240.11 |
| 2006/0133503 A1 | 6/2006 | Park et al. | |
| 2006/0153295 A1 * | 7/2006 | Wang et al. .............. | 375/240.08 |

(Continued)

FOREIGN PATENT DOCUMENTS

| | | |
|---|---|---|
| KR | 2002-0081777 | 10/2002 |
| KR | 10-2003-0050387 | 6/2003 |

(Continued)

OTHER PUBLICATIONS

H. Li, Z G Li, & C. Wen, "Fast Mode Decision Algorithm for Inter-Frame Coding in Fully Scalable Video Coding", 16 IEEE Trans. on Circuits & Sys. for Video Tech. 889-895 (Jul. 2006).*

(Continued)

*Primary Examiner* — Dave Czekaj
*Assistant Examiner* — David N Werner
(74) *Attorney, Agent, or Firm* — Staas & Halsey LLP

(57) ABSTRACT

A scalable encoding apparatus that determines a motion mode of an enhanced layer using motion information of a base layer in a scalable video coding having a structure of the base layer and the enhanced layer. The scalable encoding apparatus includes: a second image detector that detects a current image frame from images input to the enhanced layer; a second motion detector that assigns weight to motion modes of a macro block and macro blocks adjacent to the macro block of the current image frame based on motion mode information and motion vector information obtained from the current image frame of the BASE LAYER, determines motion modes for the current image frame of the enhanced layer by applying the weight and comparing a sum of calculated mode values and a plurality of thresholds, and detects the corresponding motions; and a second motion compensator that compensates the motions detected in the second motion detector to compress the current image frame.

16 Claims, 14 Drawing Sheets

(56) References Cited

U.S. PATENT DOCUMENTS

| | | | |
|---|---|---|---|
| 2007/0160137 A1* | 7/2007 | Guo et al. | 375/240.1 |
| 2007/0171969 A1* | 7/2007 | Han et al. | 375/240.1 |
| 2007/0274388 A1* | 11/2007 | Lee et al. | 375/240.13 |
| 2008/0002767 A1* | 1/2008 | Schwarz et al. | 375/240.12 |
| 2008/0165844 A1* | 7/2008 | Karczewicz | 375/240.03 |
| 2009/0028247 A1* | 1/2009 | Suh et al. | 375/240.25 |
| 2009/0129474 A1* | 5/2009 | Pandit et al. | 375/240.16 |
| 2009/0279608 A1* | 11/2009 | Jeon et al. | 375/240.16 |

FOREIGN PATENT DOCUMENTS

| | | |
|---|---|---|
| KR | 10-2004-0008359 | 1/2004 |
| KR | 10-2005-0043511 | 5/2005 |
| KR | 10-2005-0045746 | 5/2005 |
| KR | 10-2005-0098742 | 10/2005 |
| KR | 10-2006-0063614 | 6/2006 |
| KR | 10-2007-0090273 | 9/2007 |
| KR | 10-2008-0075987 | 8/2008 |

OTHER PUBLICATIONS

Y. Liu, K. Tang, & H. Cui, "Efficient Probability Based Macroblock Mode Selection in H.264/AVC", 5960 Proc. SPIE 596037 (Jul. 31, 2006).*

A. Tourapis, F. Wu, & S. Li, "Direct macroblock coding for predictive (P) pictures in the H.264 standard", Microsoft Research, Jan. 2004.*

Hung-Chih Lin et al., "Layer-Adaptive Mode Decision and Motion Search for Scalable Video Coding With Combined Coarse Granular Scalability (CGS) and Temporal Scalability", ICIP 2007, pp. 289-292.

He Li et al., "Fast Mode Decision Algorithm for Inter-Frame Coding in Fully Scalable Video Coding", IEEE Transactions on Circuits and Systems for Video Technology, vol. 16, No. 7, Jul. 2006, pp. 889-895.

* cited by examiner

Mode 16 x 16

(a)

Mode 8 x 16

(b)

Mode 16 x 8

(c)

Mode 8 x 8

| MODE | MACRO BLOCK(MB) MODE | OCCUPATION RATE | MODE | SUB BLOCK(MB) MODE | OCCUPATION RATE |
|---|---|---|---|---|---|
| 0 | SKIP | 0.003 | 0 | DirectMode | 0.0007 |
| 1 | Mode 16 x 16 | 2.2 | 8 | BlockMode 8 x 8 | 0.08 |
| 2 | Mode 16 x 8 | 4.3 | 9 | BlockMode 8 x 4 | 17.1 |
| 3 | Mode 8 x 16 | 4.3 | 10 | BlockMode 4 x 8 | 17.1 |
| 4 | Mode 8 x 8 | 77.4 | 11 | BlockMode 4 x 4 | 34.6 |

FIG. 3B

| BL \ EL | SKIP | MODE 16x16 | MODE 16x08 | MODE 08x16 | MODE 8x8 |
|---|---|---|---|---|---|
| SKIP | 18566 | 4432 | 596 | 635 | 395 |
| MODE 16x16 | 9195 | 4591 | 1171 | 1062 | 915 |
| MODE 16x08 | 2067 | 2323 | 1357 | 753 | 854 |
| MODE 08x16 | 2234 | 2515 | 877 | 1633 | 831 |
| MODE 8x8 | 2177 | 3232 | 2716 | 2765 | 3603 |

FIG. 3C

| | SKIP | MODE 16x16 | MODE 16x08 | MODE 08x16 | MODE 8x8 |
|---|---|---|---|---|---|
| FREQUENCY | 34239 | 17903 | 6717 | 6848 | 6598 |
| FREQUENCY RATE(%) | 0.473536 | 0.2476039 | 0.09289814 | 0.094709909 | 0.091252334 |

FIG. 4A

| MACRO BLOCK(MB) MODE | WEIGHT |
|---|---|
| SKIP | 0 |
| Mode 16 x 16 | 1 |
| Mode 16 x 8 | 2 |
| Mode 8 x 16 | 2 |
| Mode 8 x 8 | 4 |

FIG. 4B

| C/E | E/C | B | SUM |
|---|---|---|---|
| SKIP | SKIP | SKIP | 0 |
| | | Mode 16 x 16 | 1 |
| | | Mode 16 x 8 | 2 |
| | | Mode 8 x 8 | 4 |
| | Mode 16 x 16 | SKIP | 3 |
| | | Mode 16 x 16 | 4 |
| | | Mode 16 x 8 | 5 |
| | | Mode 8 x 8 | 7 |
| | Mode 16 x 8 | SKIP | 6 |
| | | Mode 16 x 16 | 7 |
| | | Mode 16 x 8 | 8 |
| | | Mode 8 x 8 | 10 |
| | Mode 8 x 8 | SKIP | 12 |
| | | Mode 16 x 16 | 13 |
| | | Mode 16 x 8 | 14 |
| | | Mode 8 x 8 | 16 |

FIG. 5

|  | $TH1_{MODE}$ | $TH2_{MODE}$ | $TH3_{MODE}$ |
|---|---|---|---|
| SKIP | 6 | 17 | 25 |
| Mode 16 x 16 | 13 | 23 | 29 |
| Mode 16 x 8<br>Mode 8 x 16 | 21 | 26 | 32 |
| Mode 8 x 8 | 38 | 45 | 53 |

① : 4A1
② : 2A2+2E
③ : 2A3+2C
④ : C+E
⑤ : A4+B

① : 4A2
② : 2A1+2F
③ : 2A4+2E
④ : A3+D
⑤ : C+F

① : 4A3
② : 2A4+2E
③ : 2A1+2H
④ : A2+G
⑤ : E+H

① : 4A4
② : 2A3+2F
③ : 2A2+2H
④ : F+H
⑤ : A1+I

APPARATUS AND METHOD FOR SCALABLE ENCODING

RELATED APPLICATIONS

The present application claims priority to Korean Patent Application Serial Number 10-2008-0132522, filed on Dec. 23, 2008, the entirety of which is hereby incorporated by reference.

BACKGROUND OF THE INVENTION

1. Field of the Invention

The present invention relates to a scalable encoding apparatus and method and in particular, to a scalable encoding apparatus and method for performing fast compression without deteriorating image quality by performing fast motion prediction in an enhanced layer using motion information of a lower layer when performing scalable video coding providing various bitrates, among video data compression technologies.

2. Description of the Related Art

In general, due to uncompressed digital data having a very large size, image signals to be transmitted and stored should be compressed. In other words, in order to minimize a bandwidth required to transmit digitally encoded video data, a video compression algorithm has been applied to the digitally encoded video data.

A video compression technology according to the related art compresses a large capacity of video data under the assumption that it provides a predetermined network bandwidth within a limited operational environment of hardware, but does not consider a flexible network environment.

Therefore, in order to compress the video data to be used under the network environment where the bandwidth frequently varies, a new compression technology is needed. A scalable video codec algorithm was developed in order to solve the above problem.

However, the scalable video codec, which is an extended codec based on currently and widely used H.264 (MPEG-4 AVC), provides three different types of scalabilities associated with spatial, temporal, and image quality aspects; accordingly, the complexity is significantly increased. Therefore, the complexity should be lowered in order to be able to apply to various platform terminals or service applications.

As a result, the scalable video codec providing three scalabilities based on the complex algorithm of H264 essentially performs a significantly complex operation as compared to H.264. The complex video codec cannot perform user desired fast encoding upon processing general video signals. Therefore, a method for effectively fast encoding an algorithm without deteriorating image quality should be researched.

SUMMARY OF THE INVENTION

It is an object to the present invention to provide a scalable encoding apparatus and method for fast determining a motion mode in an enhanced layer using motion information obtained upon compressing images in a base layer when encoding images in a scalable video codec having high complexity.

In addition, it is another object of the present invention to provide a scalable encoding apparatus and method for shortening the time consumed to encode the corresponding images by fast determining a motion mode in an enhanced layer.

In order to achieve the above objects, a scalable encoding apparatus according to the present invention is a scalable encoding apparatus that determines a motion mode of an enhanced layer using motion information of a base layer in a scalable video coding having the base layer and the enhanced layer. The scalable encoding apparatus includes: a second image detector that detects a current image frame from images input to the enhanced layer; a second motion detector that assigns weight to motion modes of a macro block and macro blocks adjacent to the macro block of the current image frame based on motion mode information and motion vector information obtained from the current image frame of the base layer, determines motion modes for the current image frame of the enhanced layer by applying the weight and comparing a sum of calculated mode values and a plurality of thresholds, and detects the corresponding motions; and a second motion compensator that compensates the motions detected in the second motion detector to compress the current image frame.

The second motion detector up-samples the motion vector for each image frame of the base layer twice and applies it to the motion vector for the current image frame of the enhanced layer.

The second motion detector calculates the plurality of thresholds that are a reference value determining the motion mode of the enhanced layer by applying the weight to each motion mode of the corresponding macro block for the current image frame of the enhanced layer.

The motion mode includes at least one of a first mode, a second mode, a third mode, and a fourth mode according to a size of each macro block for the current image frame of the enhanced layer.

The plurality of thresholds include a first threshold, a second threshold, and a third threshold and the second motion detector determines the motion modes for the current image frame of the enhanced layer according to the comparison result of the sum of the mode values with the first threshold, the second threshold, and the third threshold.

The second motion detector determines the motion modes for the current image frame of the enhanced layer as the first mode and the second mode when the sum of the mode values is smaller than the first threshold.

The second motion detector determines the motion modes for the current image frame of the enhanced layer as the second mode and the third mode when the sum of the mode values is larger than the first threshold and smaller than the second threshold value.

The second motion detector determines the motion modes for the current image frame of the enhanced layer as the third mode and the fourth mode when the sum of the mode values is larger than the second threshold and is smaller than the third threshold value.

The second motion detector determines the motion modes for the current image frame of the enhanced layer as the fourth mode when the sum of the mode values is larger than the third threshold.

The second motion detector assigns different weights according to the position of the macro blocks adjacent to the macro block when assigning weight to the motion modes of the macro block and macro blocks adjacent to the macro block of the current image frame.

In order to achieve the above objects, a scalable encoding method according to the present invention is a scalable encoding method that determines a motion mode of an enhanced layer using motion information of a base layer in a scalable video coding having the base layer and the enhanced layer. The scalable encoding method includes: assigning weight to motion modes of a macro block and macro blocks adjacent to the macro block of the current image frame of the enhanced layer based on motion mode information and motion vector information obtained from each image frame of the base layer to calculate a sum of mode values for the motion modes of the corresponding macro blocks; comparing the sum of the mode values for the motion modes of the macro block with a plurality of thresholds in the current image frame to select the motion modes for the current image frame of the enhanced layer; and performing the motion modes for the current image frame selected in the selecting.

The scalable encoding method further includes, prior to calculating, up-samples the motion vector for each image frame of the base layer twice and applies it to the motion vector for the current image frame of the enhanced layer.

The scalable encoding method further includes, prior to calculating, calculating the plurality of thresholds that are a reference value determining the motion mode of the current image frame of the enhanced layer by assigning the weight to each motion mode of the corresponding macro block for the current image frame of the enhanced layer.

The motion mode includes at least one of a first mode, a second mode, a third mode, and a fourth mode according to a size of each macro block for the current image frame of the enhanced layer.

The plurality of thresholds include a first threshold, a second threshold, and a third threshold and the determining the motion mode determines the motion modes for the current image frame of the enhanced layer according to the comparison result of the sum of the mode values with the first threshold, the second threshold, and the third threshold.

The determining the motion mode determines the motion modes for the current image frame of the enhanced layer as the first mode and the second mode when the sum of the mode values is smaller than the first threshold.

The determining the motion mode determines the motion modes for the current image frame of the enhanced layer as the second mode and the third mode when the sum of the mode values is larger than the first threshold and smaller than the second threshold value.

The determining the motion mode of the enhanced layer determines the motion modes for the current image frame of the enhanced layer as the third mode and the fourth mode when the sum of the mode values is larger than the second threshold and smaller than the third threshold value.

The determining the motion mode of the enhanced layer determines the motion modes for the current image frame of the enhanced layer as the fourth mode when the sum of the mode values is larger than the third threshold.

The calculating the sum of the mode values assigns different weights according to the position of the macro blocks adjacent to the macro block when assigning weight to the motion modes of the macro block and the macro blocks adjacent to the macro block.

The present invention can determine the corresponding images by fast determining the motion mode in the enhanced layer using the motion information obtained when compressing images in the base layer and fast determines the motion mode in the enhanced layer, making it possible to shorten the time needed to encode the corresponding images.

In addition, the scalable encoding apparatus can be applied to more platforms when fast encoding is achieved, such that it can be used for many applications.

BRIEF DESCRIPTION OF THE DRAWINGS

FIG. 3A to FIG. 8 are exemplary diagrams referenced for explaining the configuration of the scalable encoding apparatus according to one embodiment of the present invention.

DETAILED DESCRIPTION OF THE PREFERRED EMBODIMENTS

Hereinafter, exemplary embodiments of the present invention will be described with reference to the accompanying drawings.

Figure 1:
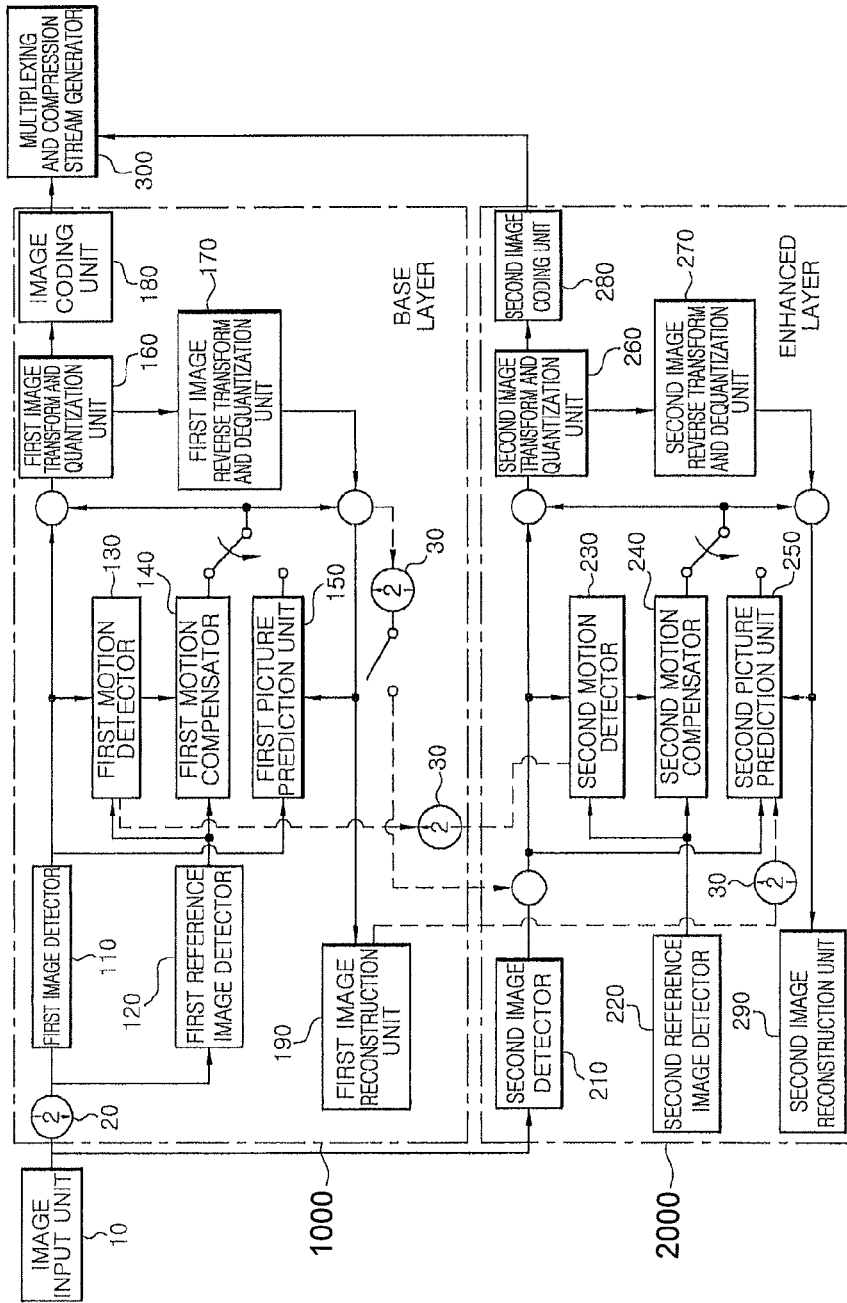
FIG. 1 is a block diagram referenced for explaining a configuration of a scalable encoding apparatus according to the present invention.

FIG. 1 is a block diagram referenced for explaining a configuration of a scalable encoding apparatus according to the present invention. As shown in FIG. 1, the scalable encoding apparatus according to the present invention is configured of a multi-layer structure that provides various bit streams applicable to several network situations. In other words, FIG. 1 shows two layers that assist spatial and temporal scalable functions, that is, a base layer 100 that compresses and processes video data using an H.264 compression algorithm and an enhanced layer 200 that increases compression efficiency using an H.264 algorithm while encoding information of a base layer 100.

The scalable encoding apparatus according to the present invention performs in the base layer 1000, for example, the international standards for MPEG-2 or MPEG-4, to generate a compression stream using a scalable video codec. Thereafter, the image compression is performed in the enhanced layer 2000 based on motion vector information of the compressed image in the base layer 1000.

First, the scalable encoding apparatus according to one embodiment of the present invention includes an image input unit 10, a base layer 100, an enhanced layer 200, and a multiplexing and compression stream generator 300.

Herein, a configuration for compressing the image performed in the base layer 1000 in the scalable encoding apparatus according to an embodiment of the present invention includes a down sampler 20, a first image detector 110, a first reference image frame detector 120, a first motion detector 130, a first motion compensator 140, a first picture prediction unit 150, a first image conversion and quantization unit 160, a first image reverse conversion and dequantization unit 170, an image coding unit 180, and a first image reconstruction unit 190.

Further, a configuration for compressing the image of the enhanced layer 200 in the scalable encoding apparatus according to an embodiment of the present invention includes an up sampler 30, a second image detector 210, a second reference image detector 220, a second motion detector 230, a second motion compensator 240, a second picture prediction unit 250, a second image conversion and quantization unit 260, a second image reverse conversion and dequantization unit 270, an image coding unit 280, and a second image reconstruction unit 290.

In the scalable encoding apparatus according to the embodiment of the present invention, when the image is compressed in the base layer 1000, a size of an original image input through the image input unit 10 is input as a size applied to the enhanced layer 200. Therefore, the down sampler 20 down samples the original image twice and is then input as the current image of the base layer 100 for spatial scalability.

The first image detector 110 extracts the input current image and the first reference image detector 120 extracts images before and after the current image for the base layer 100 as a reference image. In addition, the first picture prediction unit 150 predicts motions within the screen using only the input current image.

The first motion detector 130 detects motions using a current image extracted from the first image detector 110 and a reference image extracted from the first reference image detector 120. The first motion compensator 140 compensates for the motions detected from the first motion detector 130 by applying the reference image to the current image to perform inter-picture compression.

In this way, the first motion detector 130 and the first motion detector 240 determine the optimal motion mode and perform the compression.

Herein, when the optimal motion mode is determined in the base layer 100, the first image transform and quantization unit 160 performs the corresponding compression at the expense of the loss of original data through discrete cosine (DCT) transform and quantization In addition, the image coding unit 180 performs entropy coding, etc., using a probabilistic statistics in order to perform the efficient compression.

In addition, the first image reverse conversion and dequantization unit 170 performs the dequantization and reverse conversion to generate the reconstruction image used in the first motion detector 130, the first motion compensator 140, and the first picture prediction unit 150. At this time, the first image reconstruction unit 190 generates the dequantization and reverse converted reconstruction image by the first image reverse conversion and dequantization unit 170.

The case of the image compression of the base layer 1000 of the scalable encoding apparatus according to the embodiment of the present invention corresponds to each base layer 100 and uses all the algorithms that was used in the base layer 100 and further uses information coming from the base layer 100 once more to increase the compression efficiency. In other words, each component of the enhanced layer 200 corresponds to each component of the base layer 100, such that it is operated at the same algorithm. Therefore, the detailed description of each component of the enhanced layer 200 will be omitted.

At this time, the enhanced layer 200 uses the motion vector that is up-sampled twice from the up-sampler 20 for the motion vector of the current image frame coming from the base layer 100. Therefore, it can use the motion vector that does not cause the deterioration of image quality. The same method is applied to the remaining image to increase the efficiency of compression.

In addition, the second motion detector 230 in the enhanced layer 2000 uses the motion information on the current image frame of the base layer 100 to fast determine the motion mode for the current image frame of the enhanced layer 200. Therefore, the image compression efficiency is increased as the motion mode determination time, which needs the most time for compressing the image, is shortened. The detailed description of the operation of determining the motion mode in the second motion detector 230 will be described with reference to the following embodiments.

Meanwhile, the first motion detector 130 and the second motion detector 230 use seven kinds of motion compensation block sizes like H.264 having a single layer. The embodiment thereof will be described with reference to FIGS. 2A and 2B.

Figure 2A:
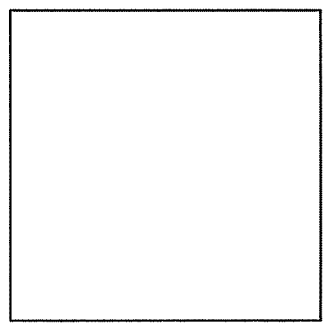
FIGS. 2A and 2B show exemplary diagrams showing a structure of a macro block according to one embodiment of the present invention.
Figure 2A:
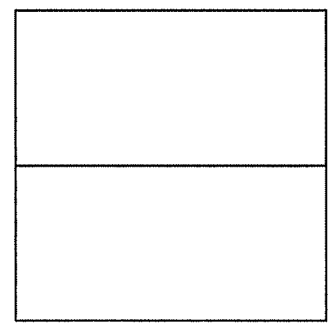
Figure 2A:
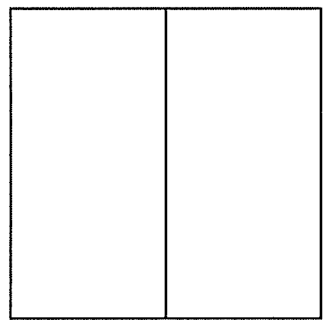
Figure 2A:
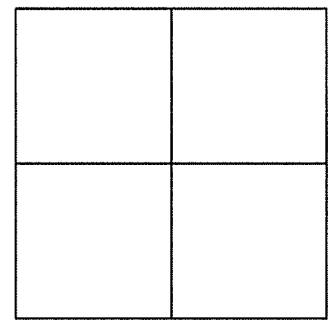
Figure 2B:
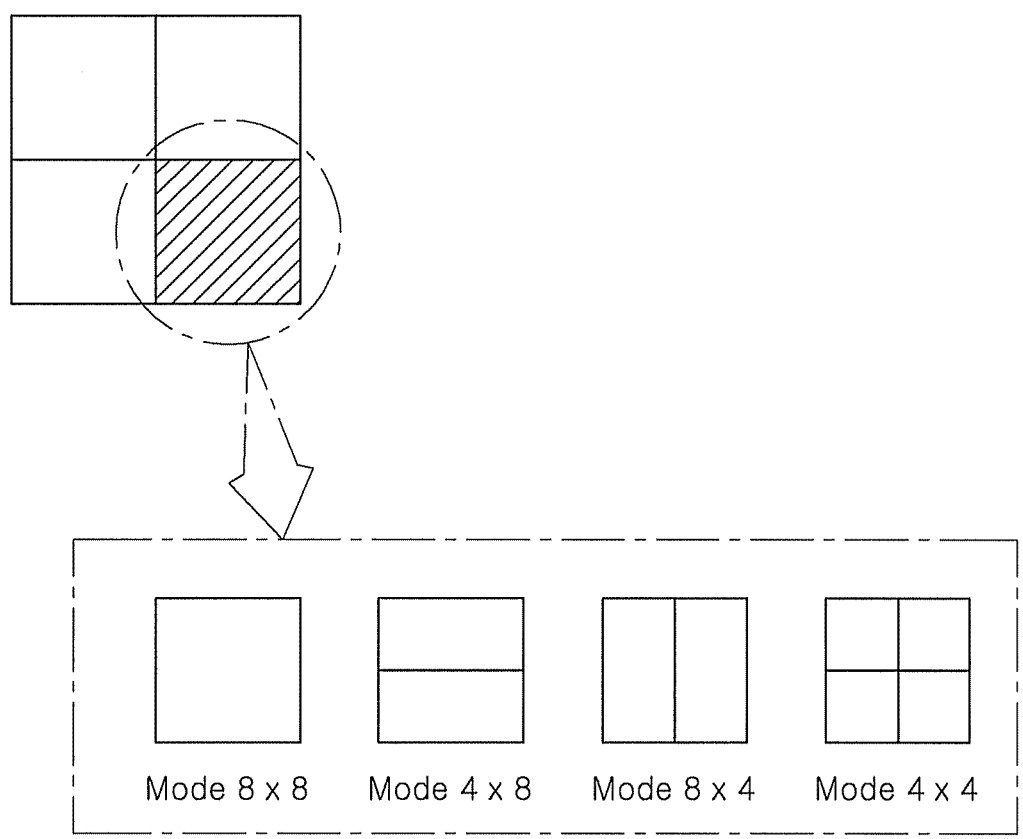

FIG. 2A shows the size of the macro block applied to the present invention and FIG. 2B shows the sub block size of the macro block applied to the present invention.

Referring to FIGS. 2A and 2B, the macro block (MB) has a size of 16×16, 8×16, 16×8, and 8×8 according to each mode. Further, the 8×8 macro block has a sub block (SB) of 8×4, 4×8, and 4×4 size. Therefore, the first motion detector 130 and the second motion detector 230 use the macro block and the sub block having seven kinds of sizes for the motion compensation for the current image frame of the base layer 100 and the enhanced layer 200.

At this time, the motion modes are classified according to the size of each macro block and sub block.

Meanwhile, as the motion predicting mode, there are a total of five motion modes, that is, macro block modes, including MODE 16×16, MODE 8×16, MODE 16×8 and MODE 8×8, and a skip mode that are motion modes according to the size of the macro block.

Herein, the skip mode is assumed to be the first mode and MODE 16×16 is assumed to be a second mode, as claimed in the claims of the present invention. Further, MODE 8×16 or MODE 16×8 is assumed to be the third mode and MODE 8×8 is assumed to be a fourth mode, as claimed in the claims of the present invention.

Moreover, in the case of MODE 8×8 in the macro block mode, there are a total of motion modes, that is, sub block modes, including MODE 8×8, MODE 8×4, MODE 4×8 and MODE 4×4, and direct mode that are motion modes of the sub block size.

Meanwhile, in compressing the image frame using the scalable encoding apparatus according to the present invention, time used in the motion detection is about 97.7%, which occupies a considerable portion. In other words, considerable portions of the video encoding are used to determine the motion mode. This can be appreciated through the experimental data of FIGS. 3A to 3C.

FIGS. 3A to 3C show the experimental data detected during the performance of each motion mode.

First, FIG. 3A shows a time rate that occupies each motion mode while the macro block mode and the sub block mode are performed.

The skip mode or direct mode among the motion modes copies images, which are found by the predicted motion vector in the base layer 100, as they are. Therefore, the skip mode or the direct mode has low calculation as compared to other modes and accordingly, the time occupation rate is also low.

Moreover, other motion modes except for the skip mode or the direct mode detect the optimal motion vector that has the lowest deterioration in the image quality within the search range according to the block size of each mode and determines the optimal mode by being linked with the allocated bit rate.

In other words, considering the time occupation time of each motion mode, it can be confirmed that as the block size is getting smaller, the complexity becomes higher. Therefore, the present invention determines the motion mode having the lower time occupation rate and larger block size, thereby minimizing the time consumed to compress images.

Therefore, in order to obtain the motion vector for one macro block in the base layer 100, a total of 10 motion modes each should be performed and in the case of the enhanced layer 200, a base layer skip flag is checked according to the motion vector or the remaining image obtained in the base layer to further perform the motion detection.

FIG. 3B shows the images detected while each motion mode in the base layer and the enhanced layer is performed and FIG. 3C is a frequency detecting the images in each mode from FIG. 3B.

As shown in FIG. 3B, the motion mode according to various video sequences is first classified according the base layer 100 and the enhanced layer 200.

Even when the image used for compressing the images has values such as quantization coefficient (QP), it has many differences according to an image having many motions, an image having small motion, an image having a small background picture, an image having many background pictures, etc. Therefore, in order to obtain accurate experimental data, the collection of a lot data is needed. FIG. 3B shows data collected based on the assumption that a value of $QP_{BL}$, which is the quantization coefficient of the base layer 100, is 26 and a value of $QP_{EL}$, which is the quantization coefficient of the enhanced layer 200, is 30 when sequentially viewing three basic images using the scalable video codec.

Herein, it is preferable that the three basic images selects a sequence having many motions, a sequence having a proper motion, and a sequence having a small motion upon collecting data so that statistic data do not lean to one side and data can be classified using more sequences.

At this time, the motion mode relationship of the current image frame between the base layer 100 and the enhanced layer 200 can be appreciated from FIG. 3B. As one example, when the motion mode for the current image frame of the base layer 100 is the skip mode, it can be appreciated that the probability that the motion mode for the current image frame of the enhanced layer 200 will be the skip mode is 75.4%, the probability that the motion mode will be MODE 16×16 is 18%, the probability that the motion mode will be MODE 16×8 or MODE 8×16 is about 2.5%, and the probability that the motion mode will be MODE 8×8 is about 1.6%.

Hereinafter, the threshold to determine the motion mode for the macro block of the current image frame is calculated according to probability distribution for each mode of FIG. 3B. In order to fast determine the motion mode of the corresponding macro block, the detailed description to calculate the thresholds for each motion mode will be described with reference to the embodiment of FIG. 5.

Therefore, in the situation where the motion mode information of the base layer 100 is known, a predetermined threshold is given to each motion mode to fast determine the optimal motion mode, thereby removing the modes having high complexity.

As one example, as shown in FIGS. 3A to 3C, when the motion mode is determined in a portion where the time occupation rate is low and the image detection frequency is high like the skip mode, MODE 16×16, etc., the MODE 8×8 having high time occupation rate and the low image detection frequency, etc., can be removed. In this case, the time consumed to determine the motion mode that occupies the largest portion in compressing the image can be shortened.

FIGS. 4A and 4B show the operation of calculating thresholds to determine the motion mode in the second motion detector of the enhanced layer according to the present invention.

FIG. 4A shows the weight assigned to the motion mode of the macro block.

Essentially, even though the motion mode of the corresponding macro block (MB) of the base layer 100 is known, the probability that the motion mode of the corresponding macro block in the enhanced layer 200 will be the same as the motion mode of the base layer 100 is low except for the skip mode. In other words, in other motion modes except for the skip mode, since the corresponding macro blocks can be changed by adjacent macro blocks, even though the corresponding macro blocks are the same, the motion modes of the base layer 100 and the enhanced layer 200 can be different from each other.

Therefore, when the second motion detector 230 determines the motion mode for the current image frame of the enhanced layer 200, it should consider the motion modes of the corresponding macro block as well as the macro blocks adjacent to the corresponding macro block. To this end, the second motion detector 230 assigns weight to each macro block according to the position of the macro block adjacent the corresponding macro block and calculates thresholds according to the probability distribution of each motion mode.

In other words, the effect of the macro block adjacent to the corresponding macro block is classified into the directivity and motion mode of the macro block. First, considering the effect of the directivity, since the block that exists in the horizontal/vertical direction has a larger effect than a diagonal direction of the corresponding block and the corresponding block has a larger effect than other adjacent blocks. As shown in FIG. 7, the diagonal direction block is assigned with weight '1', the horizontal/vertical direction block is assigned with weight '2', and the corresponding macro block is assigned with weight '4'.

Considering the effect according to the motion mode, as shown in FIG. 4A, the weight assigned to the skip mode in the motion modes of the macro block is '0' and the weight assigned to MODE 16×16 is '1', the weight assigned to MODE 16×8 and MODE 8×16, and the weight assigned to MODE 8×8 is '4'.

Of course, the weight assigned in FIG. 4A is only a numerical value defined by predetermined experimental data and therefore, can be varied according to the embodiments.

Meanwhile, FIG. 4B shows a sum of product of the directivity weights for the BASE LAYER, the enhanced layer, and the adjacent macro blocks and the motion modes based on the weight assigned in FIG. 4A.

Figure 6:
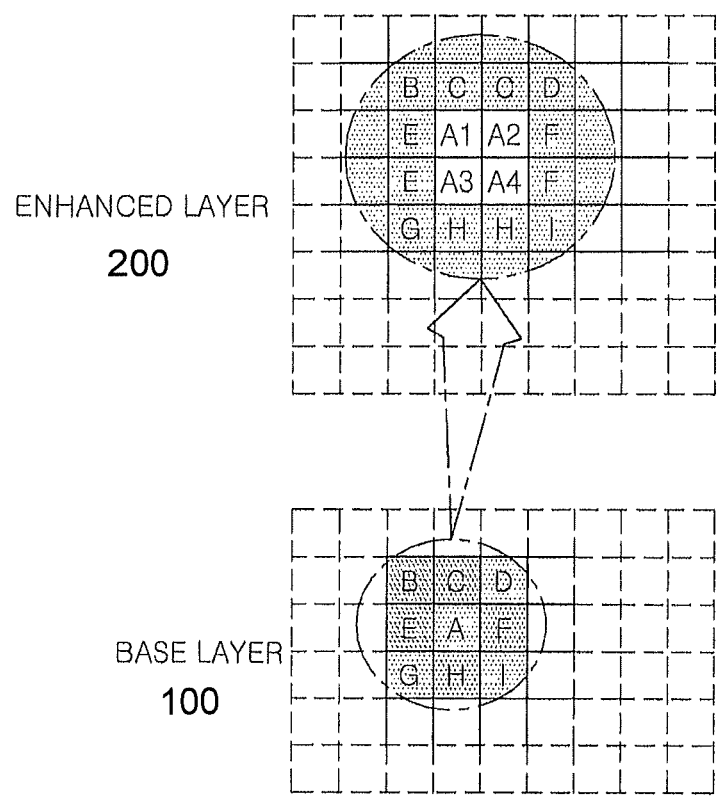

When assigning the spatial scalability, as shown in FIG. 6, since the corresponding macro block of the enhanced layer is determined by the motion mode value that is expanded in the base layer in two-fold, it can be appreciated that each corresponding macro block is affected by three adjacent macro blocks that comes from the BASE LAYER. In other words, in FIG. 6, when the motion mode of the macro block corresponding to A1 is predicted, it can be appreciated that the motion mode in the base layer of E, C, B, A2, A3, and A4 is associated with the prediction. At this time, A2, A3, and A4 are ones expanded in the motion mode of A in the base layer and have the same values, such that three macro blocks like E, C, and B have substantially an effect on the motion mode of the enhanced layer.

FIG. 4B shows the case where the motion block of the corresponding macro block in the BASE LAYER, that is, 'A' is the skip mode under the above situation. In other words, in the state where the motion mode of the corresponding macro block in the base layer 100 is the skip mode, a result of a product and addition of each weight and the corresponding mode, that is a sum of the motion modes is shown in the adjacent macro block (corresponding to E, C, and B in FIG. 6).

In other words, when the motion mode of the corresponding macro block in the enhanced layer 200 is the skip mode, if the motion modes of the adjacent macro blocks are a skip mode (C/E), a skip mode (E/C), and a skip mode (B), SUM becomes '0' and if the motion modes are the skip mode (C/E), the skip mode (E/C), and the MODE 16×16(B), SUM becomes '1'. Further, if the motion modes of the adjacent macro blocks are the skip mode (C/E), the skip mode (E/C), MODE 16×8, and MODE 8×16(B), the SUM becomes '2' and if the motion modes are the skip mode (C/E), the skip mode (E/C), and MODE 8×8(B), SUM becomes '4'.

Meanwhile, when the motion mode of the corresponding macro block in the enhanced layer 200 is the MODE 16×16, if the motion modes of the adjacent macro blocks are the skip mode (C/E), the skip mode (E/C), and the skip mode (B), the SUM becomes '3', and if the motion modes are the skip mode (C/E), the skip mode (E/C), and MODE 16×16(B), the SUM becomes '4'. Further, if the motion modes of the adjacent macro blocks are the skip mode (C/E), the skip mode (E/C), MODE 16×8, and MODE 8×16(B), the SUM becomes '5' and if the motion modes are the skip mode (C/E), the skip mode (E/C), and MODE 8×8(B), the SUM becomes '7'.

Meanwhile, when the motion mode of the corresponding macro block in the enhanced layer 200 is MODE 16×16 or MODE 8×16, if the motion modes of the adjacent macro blocks are the skip mode (C/E), the skip mode (E/C), and the skip mode (B), the SUM becomes '6' and if the motion modes are the skip mode (C/E), the skip mode (E/C), and MODE 16×16(B), the SUM becomes '7'. Further, if the motion modes of the adjacent macro blocks are the skip mode (C/E), the skip mode (E/C), MODE 16×8, and MODE 8×16(B), the SUM becomes '8', and if the motion modes are the skip mode (C/E), the skip mode (E/C), and MODE 8×8(B), the SUM becomes '10'.

Meanwhile, when the motion mode of the corresponding macro block in the enhanced layer 200 is MODE 16×16, if the motion modes of the adjacent macro blocks are the skip mode (C/E), the skip mode (E/C), and the skip mode (B), the SUM becomes '12', and if the motion modes are the skip mode (C/E), the skip mode (E/C), and MODE 16×16(B), the SUM becomes '13'. Further, if the motion modes of the adjacent macro blocks are the skip mode (C/E), the skip mode (E/C), MODE 16×8, and MODE 8×16(B), the SUM becomes '14', and if the motion modes are the skip mode (C/E), the skip mode (E/C), and MODE 8×8(B), the SUM becomes '16'.

As such, the motion mode of the enhanced layer 200 for one motion mode in the base layer 100 may have a total of 64 values according to the adjacent blocks, which is the number of cases according to four kinds of modes and three adjacent blocks.

Figure 8:
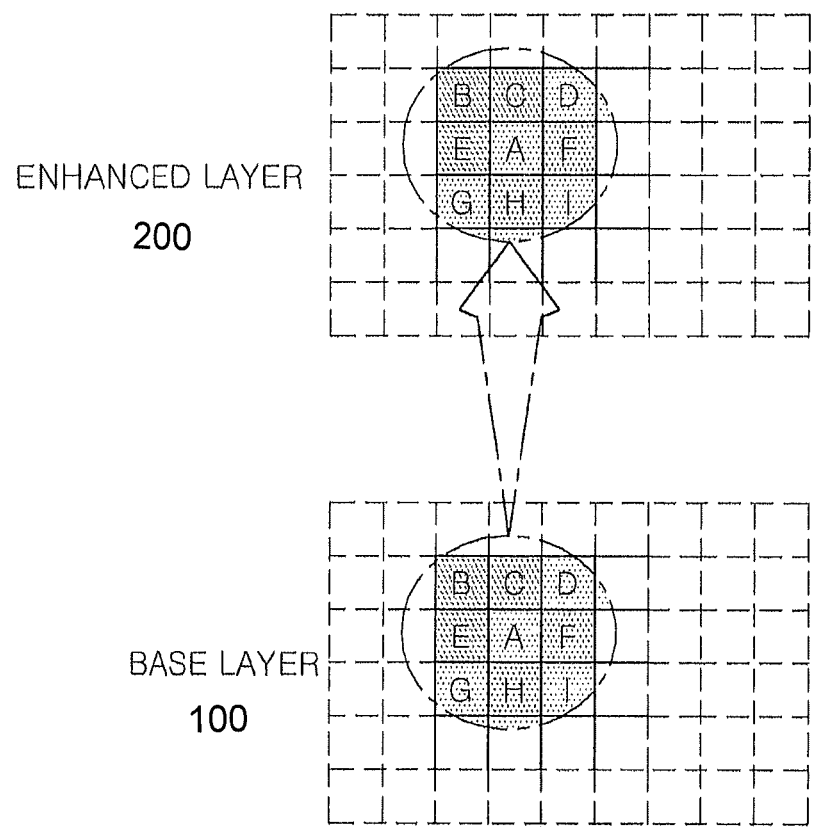

Meanwhile, as shown in FIG. 8, when assisting the image quality scalability, the motion mode of the base layer is copied into the enhanced layer as it is, such that 8 adjacent macro blocks have an effect on the corresponding macro block as they are, the number of cases corresponding to $4^8$ is generated.

FIG. 5 shows the thresholds for each motion mode calculated from the experimental data of FIGS. 3A to 4B. In particular, the second motion detector 230 of the enhanced layer 200 calculates the thresholds by applying the probability distribution of FIG. 3B. At this time, the numerical value for each motion mode is for explaining one embodiment of the present invention and therefore, is not limited to thereto.

It can be appreciated from the FIG. 3B that the probability that the motion mode of the base layer 100 is the skip mode and at the same time, the motion mode of the enhanced layer 200 will be the skip mode is about 75.4%. At this time, the value that the sum of the number of cases corresponds to a total of 64 which is calculated from FIG. 4B corresponds to 75.4% becomes the threshold selecting from the skip mode, that is, $TH1_{SKIP}$. Likewise, when obtaining $TH2_{SKIP}$ in the case where the base layer is the SKIP, the probability of the generation frequency up to the MODE 16×16 in the enhanced layer is obtained (with FIG. 3, 0.754+0.180=0.934), such that the SUM value corresponding to 0.934 is defined as the threshold in the number of cases corresponding to 64 like the above. In other words, the SUM values arranged in an ascending order according to each mode, such that the SUM value corresponding to 60 ($\approx$0.934*64) is defined as $TH2_{SKIP}$.

When the threshold is defined by the above method using the data of FIG. 3B, the value is obtained as shown FIG. 5. As shown in FIG. 4B, even though the SUM value has the number of cases, but may have the repetitive value.

The threshold of each motion mode calculated by the above way is the same as one shown in FIG. 5.

At this time, the reference value determining the skip mode becomes the first threshold value TH1. Herein, in the first threshold value, both the skip mode and the MODE 16×16 are determined.

Meanwhile, the reference determining MODE 16×16 is a second threshold TH2. In other words, MODE 16×16 is determined as the motion mode within the range of the second threshold value TH2. Of course, as described above, both the skip mode and MODE 16×16 are determined as the motion mode within the range of the first threshold TH1.

Meanwhile, the reference determining MODE 16×8 or MODE 8×16 becomes the first threshold TH1 and the third threshold TH3. In other words, MODE 16×8 or MODE 8×16 is determined as the motion mode within the range after the first threshold. Of course, both MODE 16×8 or MODE 8×16 and MODE 16×16 are determined with the motion mode that are within the range between the first threshold TH1 and the second threshold TH2.

Meanwhile, MODE 8×8 is determined as the second threshold TH2. In other words, MODE 8×8 is determined as the motion mode within the range after the second threshold. Of course, MODE 8×8 is determined as the motion mode within the range between the second threshold TH2 and the third threshold TH3.

FIGS. 6 to 8 show the operation of obtaining the comparison value to be compared with the threshold of FIG. 5 by obtaining the motion modes of the macro block and the adjacent macro blocks in the scalable encoding apparatus according to the present invention.

Figure 7A:
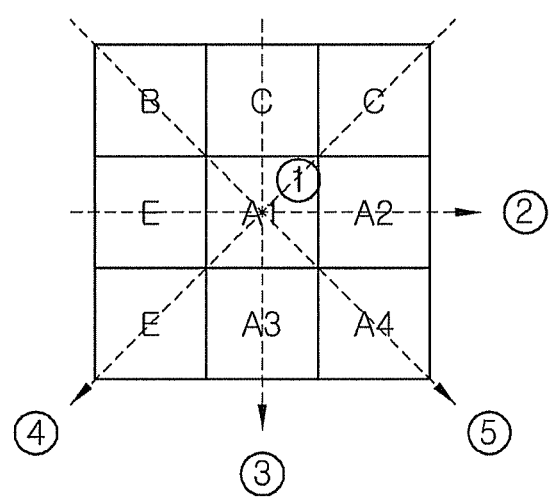
Figure 7B:
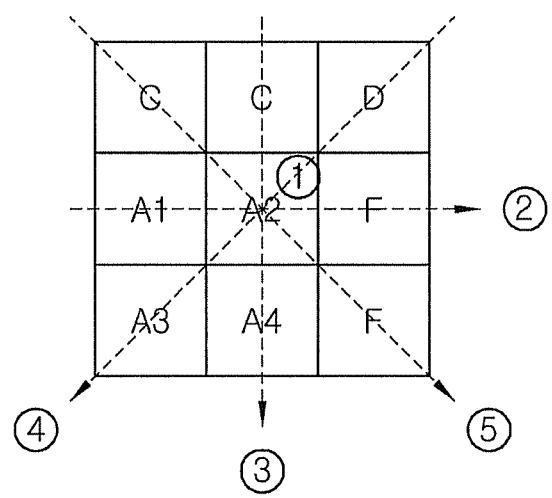
Figure 7C:
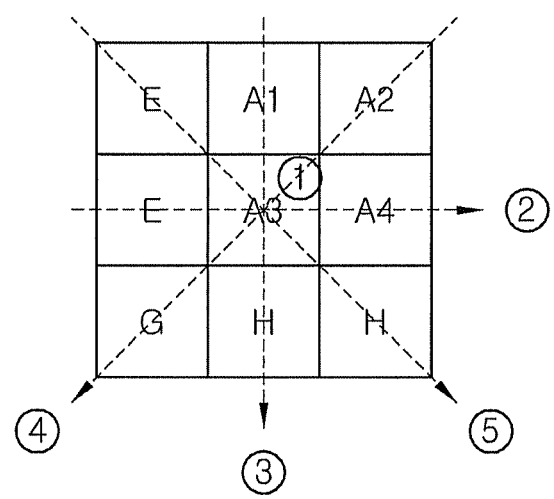
Figure 7D:
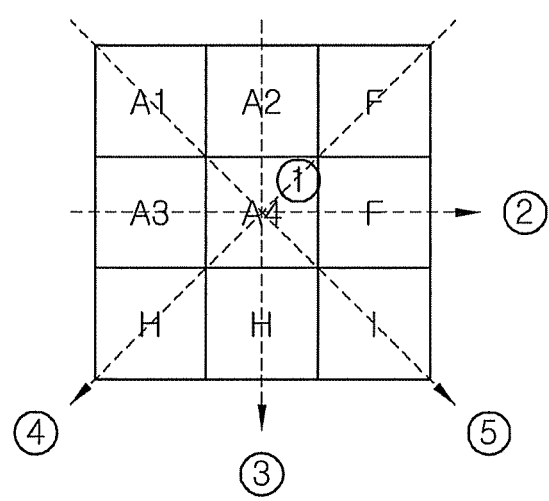

FIGS. 6 to 7D show the operation of obtaining the sum of the motion mode of the macro block and the adjacent macro blocks when the scalable encoding apparatus according to the present invention assists the spatial scalability.

Referring to FIG. 6, when assisting the spatial scalability, in order to meet the number of macro blocks of the base layer 100 and the enhanced layer 200, the motion mode of the base layer 100 is expanded twice such that it is generated to be same as the number of macro blocks of the enhanced layer 200. In other words, the macro block A of the base layer is expanded twice, thereby generating A1, A2, A3, and A4.

Referring to FIGS. 7A to 7D, the sum of the motion modes for each macro block and the adjacent macro blocks are calculated.

First, when assisting the spatial scalability, the macro block is largely affected by the adjacent macro block. Therefore, the motion mode value is set to a first value in the macro blocks according to the adjacent macro blocks for the macro block, the motion mode value of the adjacent macro block positioned in the vertical or horizontal direction is set to a second value, and the motion mode value of the adjacent macro block positioned in the diagonal direction is set to the third value. In the embodiment of the present invention, the first value is set to '4', the second value is set to '2', and the third value is set to '1'.

At this time, as shown in FIG. 7A, the sum of the motion modes of the macro block A1, that is, SUM (A1) is equal to 4A1+2(A2+E)+2(A3+C)+(C+E)+(A4+B) by applying 'A1' and the first to fourth values to the adjacent macro blocks 'A2', 'A3', 'A4', 'B', 'C', and 'E'. At this time, since A1=A2=A3=A4=A, the SUM(A1) is equal to 9A+3B+3E+B.

Meanwhile, as shown in FIG. 7B, the sum of the motion modes of the macro block 'A2', that is, the SUM (A2) is equal to 4A2+2(A1+F)+2(A4+E)+(A3+D)+(C+F) by applying 'A2' and the first to fourth values to the adjacent macro blocks 'A1', 'A3', 'A4', 'C', 'D' and 'F'. At this time, since A1=A2=A3=A4=A, the SUM(A2) is equal to 9A+3C+3F+D.

Meanwhile, as shown in FIG. 7C, the sum of the motion modes of the macro block 'A3', that is, the SUM (A3) is equal to 4A3+2(A4+E)+2(A1+H)+(A2+G)+(E+H) by applying 'A3' and the first to fourth values to the adjacent macro blocks 'A1', 'A2', 'A4', 'E', 'G' and 'H'. At this time, since A1=A2=A3=A4=A, the SUM(A3) is equal to 9A+3E+3H+G.

Meanwhile, as shown in FIG. 7D, the sum of the motion modes of the macro block 'A4', that is, the SUM (A4) is equal to 4A4+2(A3+F)+2(A2+H)+(F+H)+(A1+I) by applying 'A4' and the first to fourth values to the adjacent macro blocks 'A1', 'A2', 'A3', 'F', 'H' and 'I'. At this time, since A1=A2=A3=A4=A, the SUM(A4) is equal to 9A+2F+3H+I.

At this time, the motion vectors of A, B, C, D, E, F, G, H, and I that are the macro blocks of the base layer 100 are applied to the SUM(A1), SUM(A2), SUM(A3), and SUM(A4) and the values are compared with the threshold of FIG. 5, such that the motion mode of the enhanced layer 200 is determined.

FIG. 8 shows the macro block and the adjacent macro blocks of the base layer and the enhanced layer when assisting the image quality scalability. When assisting the image quality scalability, the number of macro blocks of the image of the base layer 100 and the enhanced layer 200 is the same, such that the image of the base layer 100 is applied to the enhanced layer 200 as it is.

At this time, the sum of the motion mode of the macro block 'A', that is, SUM (A) is equal to A+2(E+F)+2(C+H)+(D+G)+(B+I)=4A+B+2C+D+2E+2F+G+2H+ I by applying 'A' and the first to fourth values to 'B', 'C', 'D', 'E', 'F', 'G', 'H' and 'I' that are the adjacent macro blocks. Herein, as shown in FIGS. 7A and 7B, the motion vector values of A, B, C, D, E, F, G, H, and I that are the macro blocks of the base layer 100 are applied to the SUM (A) and the values are compared with the threshold of FIG. 5, such that the motion mode of the enhanced layer 200 is determined.

Of course, the values can be calculated by applying the same method to the motion mode of the macro block and the motion mode of the sub block. The value applied to each motion mode is also applied in the same method.

Figure 9A:
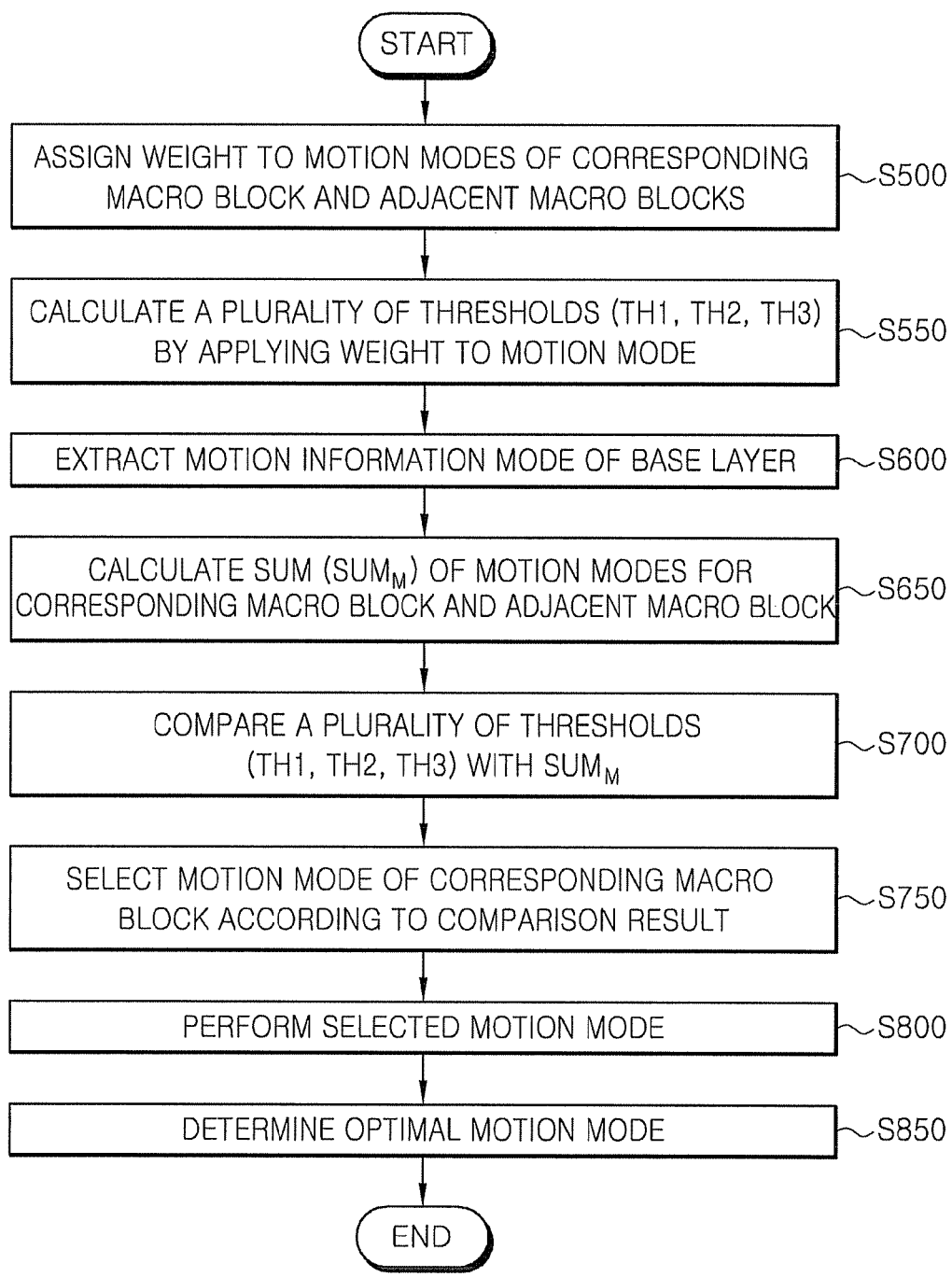
FIGS. 9A and 9B are flowcharts showing an operational flow for a scalable encoding method according to the present invention.
Figure 9B:
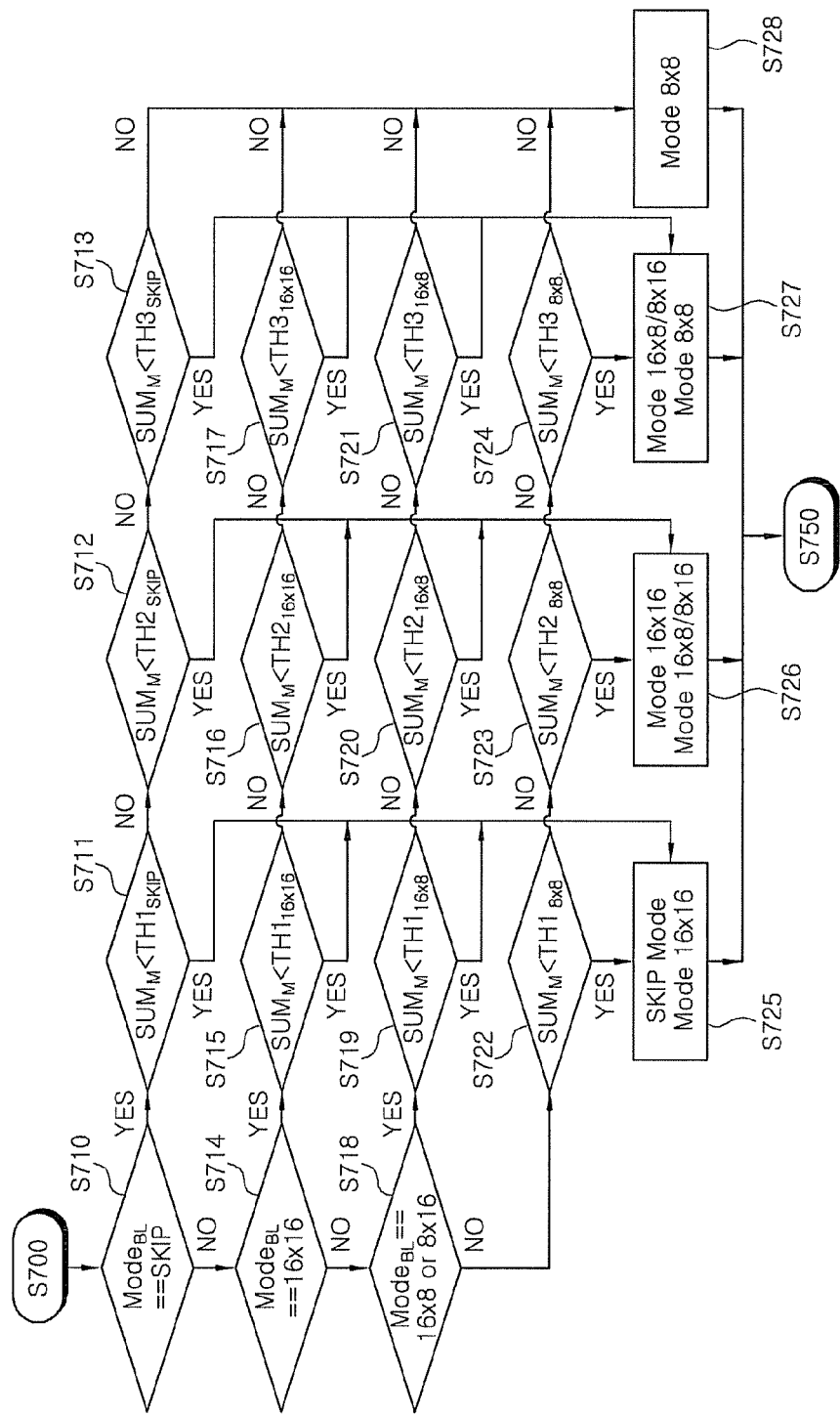

FIGS. 9A and 9B are flowcharts showing the operational flow of the scalable encoding method according to the present invention and in particular, show the scalable encoding method in the enhanced layer.

Referring to first FIG. 9A, the scalable encoding apparatus according to the present invention assigns the weight to the motion modes for the corresponding macro block and the macro blocks adjacent the corresponding macro block in the enhanced layer 200 (S500) and applies the weight assigned in 'S500' to the motion mode of the corresponding macro block, thereby calculating the plurality of thresholds TH1, TH2, and TH3 for selecting the motion mode of the corresponding macro block (S550). At this time, the probability distribution according to each motion mode of FIGS. 3A to 3C will be described.

Thereafter, the motion information of the base layer 100, that is, the motion mode information and the motion vector information are extracted (S600). At this time, the motion detector 230 calculates the sum $SUM_M$ of the corresponding macro block and the macro blocks adjacent to the corresponding macro blocks of the enhanced layer 200 based on the motion information of the base layer 100 extracted at step 'S600' (S650).

At this time, the second motion detector 230 compares the thresholds TH1, TH2, and TH3 calculated in step 'S600' and the sum $SUM_M$ of the motion modes of the corresponding macro blocks calculated at step 'S650' (S700).

Further, the motion mode of the enhanced layer 200 is selected according to the comparison result (S750) and the motion mode selected at step 'S750' is performed (S800). At this time, the detailed description of step 'S750' will be described with reference to FIG. 9B.

FIG. 9B is a flowchart of a detailed flowchart of step 'S750' and the second motion detector 230 first confirms the motion mode of the base layer 100 from the motion information of the base layer 100. When the motion mode of the base layer 100 is the skip mode (S710), the second detector 230 extracts the first threshold $TH1_{SKIP}$, the second threshold $TH2_{SKIP}$, and the third threshold $TH3_{SKIP}$ among the plurality of thresholds TH1, TH2, TH3 calculated at step 'S600' and uses them as the comparison values for the sum of the motion modes.

At this time, when the sum $SUM_M$ of the motion modes calculated at step 'S650' of FIG. 9A is smaller than the first threshold $TH1_{SKIP}$ of the skip mode (S711), the second motion detector 230 selects the motion mode of the corresponding macro block as the skip mode and MODE 16×16 in the enhanced layer 200.

Meanwhile, when the sum $SUM_M$ of the motion modes calculated at step 'S650' of FIG. 9A is larger than the first threshold $TH_{SKIP}$ of the skip mode (S711), the sum of the motion mode calculated at step 'S650' and the second threshold $TH2_{SKIP}$ of the skip mode is compared (S712). If the sum of the motion modes calculated at step 'S650' is larger than the first threshold $TH1_{SKIP}$ and smaller than the second threshold $TH2_{SKIP}$, the second motion detector 230 selects the motion mode of the corresponding macro block as MODE 16×16 and MODE 16×8 or MODE 8×16 in the enhanced layer 200 (S726).

Meanwhile, when the sum $SUM_M$ of the motion modes calculated at step 'S650' of FIG. 9A is larger than the second threshold $TH_{SKIP}$ of the skip mode (S712), the sum $SUM_M$ of the motion mode calculated at step 'S650' and the third threshold $TH3_{SKIP}$ of the skip mode is compared (S713). If the sum $SUM_M$ of the motion modes calculated at step 'S650' is larger than the second threshold $TH2_{SKIP}$ and smaller than the third threshold $TH3_{SKIP}$, the second motion detector 230 selects the motion mode of the corresponding macro block as MODE 16×8 or MODE 8×16 or MODE 8×8 in the enhanced layer 200 (S727).

On the other hand, when the sum $SUM_M$ of the motion modes calculated at step 'S650' is larger than the third threshold $TH3_{SKIP}$ (S713), the second motion detector 230 selects the motion mode of the corresponding macro block as MODE 8×8 in the enhanced layer 200.

At this time, the second motion detector 230 performs the motion mode selected at steps 'S700' and 'S750' to detect the motion in the corresponding motion mode.

Meanwhile, when the motion mode of the base layer 100 is MODE 16×16 (S714), the second detector 230 extracts the first threshold $TH1_{16 \times 16}$, the second threshold $TH2_{16 \times 16}$, and the third threshold $TH3_{16 \times 16}$ of the skip mode among the plurality of thresholds TH1, TH2, and TH3 calculated at step 'S600' and uses them as the comparison values for the sum $SUM_M$ of the motion modes. At this time, like steps 'S711' to 'S713', steps 'S715' to 'S717' are performed, such that any one of steps 'S725' to 'S728' is performed.

Meanwhile, when the motion mode of the base layer 100 is MODE 16×8 or MODE 8×16 (S718), the second detector 230 extracts the first threshold $TH1_{16\times8}$, the second threshold $TH2_{16\times8}$, and the third threshold $TH3_{16\times8}$ of the skip mode among the plurality of thresholds TH1, TH2, and TH3 calculated at step 'S600' and uses them as the comparison values for the sum $SUM_M$ of the motion modes. At this time, like steps 'S711' to 'S713', steps 'S719' to 'S721' are performed, such that any one of steps 'S725' to 'S728' is performed.

Meanwhile, when the motion mode of the base layer 100 does not corresponds to any one of the skip mode, MODE 16×16, MODE 16×8, and MODE 8×16, the second detector 230 extracts the first threshold $TH1_{8\times8}$, the second threshold $TH2_{8\times8}$, and the third threshold $TH3_{8\times8}$ of the skip mode among the plurality of thresholds TH1, TH2, and TH3 calculated at step 'S600' and uses them as the comparison values for the sum $SUM_M$ of the motion modes. At this time, like steps 'S711' to 'S713', steps 'S722' to 'S724' are performed, such that any one of steps 'S725' to 'S728' is performed.

Thereafter, the second motion detector 230 determines the optimal motion mode from the motion mode performed for the predetermined macro block (S850).

The scalable encoding apparatus and method according to the present invention as described above are not limited to the configuration and method of the embodiments as described above, but the embodiments may be configured by selectively combining all the embodiments or some of the embodiments so that various modifications can be made.

What is claimed is:

1. A scalable encoding apparatus that determines a motion mode of an enhanced layer using motion information of a base layer in a scalable video coding having the base layer and the enhanced layer, comprising:
    an image detector that detects a current image frame from images input to the enhanced layer;
    a motion detector that assigns weight to motion modes of a macro block and macro blocks adjacent to the macro block of the current image frame based on motion mode information and motion vector information obtained from the current image frame of the base layer, determines motion modes for the current image frame of the enhanced layer by applying the weight and comparing a sum of calculated mode values of the base layer and a plurality of thresholds of the base layer, and detects the corresponding motions of the enhanced layer; and
    a motion compensator that compensates the motions detected in the motion detector to compress the current image frame,
    wherein the motion mode includes at least one of a first mode, a second mode, a third mode, and a fourth mode according a size of each macro block for the current image frame of the enhanced layer,
    wherein the plurality of thresholds include a first threshold, a second threshold, and a third threshold and the motion detector determines the motion modes for the current image frame of the enhanced layer according to the comparison result of the sum of the mode values with the first threshold, the second threshold, and the third threshold.

2. The scalable encoding apparatus according to claim 1, wherein the motion detector up-samples the motion vector for the current image frame of the base layer twice and applies it to the motion vector for the current image frame of the enhanced layer.

3. The scalable encoding apparatus according to claim 1, wherein the motion detector calculates the plurality of thresholds that are a reference value determining the motion mode for the current image of the enhanced layer by applying the weight to each motion mode of the corresponding macro block for the current image frame of the enhanced layer.

4. The scalable encoding apparatus according to claim 1, wherein the motion detector determines the motion modes for the current image frame of the enhanced layer as the first mode when the sum of the mode values is smaller than the first threshold.

5. The scalable encoding apparatus according to claim 1, wherein the motion detector determines the motion modes for the current image frame of the enhanced layer as the first mode and the second mode when the sum of the mode values is larger than the first threshold and smaller than the second threshold value.

6. The scalable encoding apparatus according to claim 1, wherein the motion detector determines the motion modes for the current image frame of the enhanced layer as the second mode and the third mode when the sum of the mode values is larger than the second threshold and smaller than the third threshold value.

7. The scalable encoding apparatus according to claim 1, wherein the motion detector determines the motion modes for the current image frame of the enhanced layer as the third mode and the fourth mode when the sum of the mode values is larger than the third threshold.

8. The scalable encoding apparatus according to claim 1, wherein the motion detector assigns different weights according to the position of the macro blocks adjacent to the macro block when assigning weight to the motion modes of the macro block and macro blocks adjacent to the macro block of the current image frame.

9. A scalable encoding method that determines a motion mode of an enhanced layer using motion information of a base layer in a scalable video coding having the base layer and the enhanced layer, comprising:
    assigning weight to motion modes of a macro block and macro blocks adjacent to the macro block of the current image frame of the enhanced layer based on motion mode information and motion vector information obtained from each image frame of the base layer to calculate a sum of mode values for the motion modes of the corresponding macro blocks;
    comparing the sum of the mode values for the motion modes of the macro block with a plurality of thresholds in the current image frame to select the motion modes for the current image frame of the enhanced layer; and
    performing the motion modes for the current image frame selected in the selection,
    wherein the motion mode includes at least one of a first mode, a second mode, a third mode, and a fourth mode according to a size of each macro block for the current image frame of the enhanced layer,
    wherein the plurality of thresholds include a first threshold, a second threshold, and a third threshold and the determining the motion mode determines the motion modes for the current image frame of the enhanced layer according to the comparison result of the sum of the mode values with the first threshold, the second threshold, and the third threshold.

10. The scalable encoding method according to claim 9, further comprising, prior to the calculating, up-sampling the motion vector for each image frame of the base layer twice and applying it to the motion vector for the current image frame of the enhanced layer.

11. The scalable encoding method according to claim 9, further comprising, prior to the calculating, calculating the plurality of thresholds that are a reference value determining the motion mode of the current image frame of the enhanced layer by assigning the weight to each motion mode of the corresponding macro block for the current image frame of the enhanced layer.

12. The scalable encoding method according to claim 9, wherein the determining the motion mode determines the motion modes for the current image frame of the enhanced layer as the first mode and the second mode when the sum of the mode values is smaller than the first threshold.

13. The scalable encoding method according to claim 9, wherein the determining the motion mode determines the motion modes for the current image frame of the enhanced layer as the second mode and the third mode when the sum of the mode values is larger than the first threshold and is smaller than the second threshold value.

14. The scalable encoding method according to claim 9, wherein the determining the motion mode of the enhanced layer determines the motion modes for the current image frame of the enhanced layer as the third mode and the fourth mode when the sum of the mode values is larger than the second threshold and smaller than the third threshold value.

15. The scalable encoding method according to claim 9, wherein the determining the motion mode of the enhanced layer determines the motion modes for the current image frame of the enhanced layer as the fourth mode when the sum of the mode values is larger than the third threshold.

16. The scalable encoding method according to claim 9, wherein the calculating the sum of the mode values assigns different weights according to the position of the macro blocks adjacent to the macro block when assigning weight to the motion modes of the macro block and the macro blocks adjacent to the macro block.

* * * * *